E. F. Mac NICHOL, JR

COMMUNICATION SYSTEM

Filed Nov. 26, 1945

INVENTORS
EDWARD F. MACNICHOL JR.

BY M. O. Hayes

ATTORNEY

Patented May 4, 1954

2,677,761

UNITED STATES PATENT OFFICE 2,677,761

COMMUNICATION SYSTEM

Edward F. MacNichol, Jr., Hamilton, Mass., assignor, by mesne assignments, to the United States of America as represented by the Secretary of the Navy Application November 26, 1945, Serial No. 630,943

4 Claims. (Cl. 250—27)

This invention relates in general to communications systems and more particularly to the reception of intelligence carried in time modulated pulse transmissions.

It is often desirable to transmit intelligence over a pulsed microwave radar system. As an example of an application of such a transmission, reference is made to copending application entitled "Remote Control System," filed December 28, 1945, Serial No. 637,744. Intelligence, usually comprising an audio frequency is conveyed by the use of a periodic reference timing pulse followed by a second pulse, the time displacement of which relative to the timing pulse is modulated in accordance with the instantaneous amplitude of the audio frequency. The pulse which transfers the desired signal by virtue of its "jitter" with respect to time is often known as the carrier pulse.

It is, therefore, a primary object of the present invention to provide a simplified detector or demodulating circuit for converting the time modulation of the carrier pulse in a wave transmission of the character described into the corresponding variable amplitude modulating signal.

Figure 1:
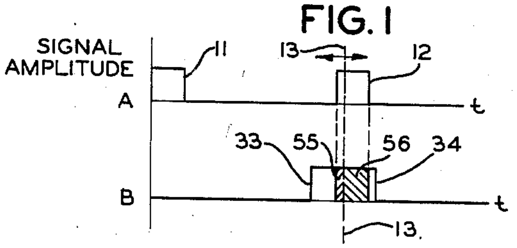
Figure 2:
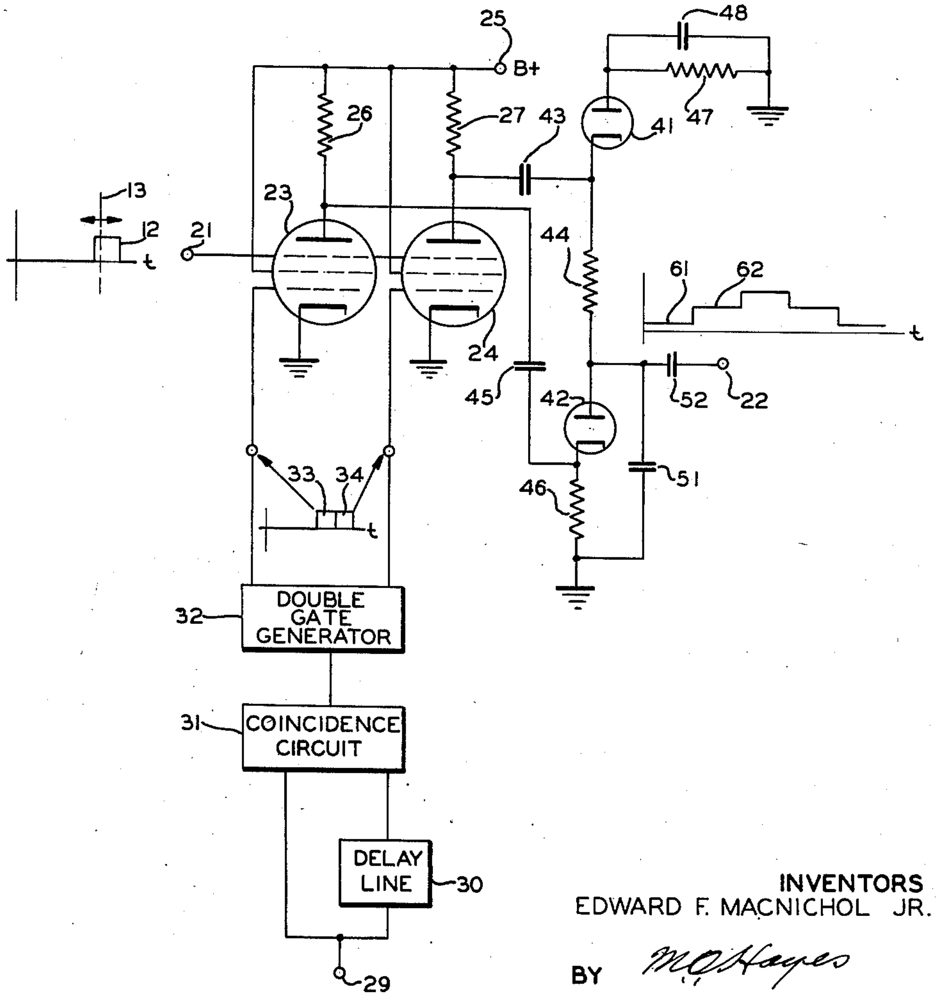

Other objects and advantages of the present invention will now become apparent from the following detailed specification taken in connection with the accompanying drawings, in which:

Fig. 1 is an illustration of the signal wave forms appearing in the circuit of the present invention; and, Fig. 2 is a schematic circuit diagram of the novel time modulation detector.

To facilitate the understanding of the novel detector which is the subject of the present invention, a brief discussion of the nature of the wave form transmitted and received in time modulation systems will be given, and reference is now made to Fig. 1A. The wave form involved comprises a periodic pulse transmission at a repetition frequency which is determined by the particular application. Each cycle of the pulse transmission includes a reference timing pulse 11, followed by the carrier pulse 12 which is positioned or time modulated with respect to pulse 11. By time modulation is meant that the time displacement between the pulse 11 and pulse 12 is varied from cycle to cycle in accordance with the instantaneous amplitude of a modulating signal. The carrier pulse 12 has a midposition as indicated by the broken line 13, which is the location in time of the center of carrier pulse 12 when the modulator signal is zero. Positive modulating signals result in a time displacement in one direction relative to the mid-position 13, and negative modulating signals result in a time displacement in the opposite direction.

As an example of a time modulation pulse system utilized in radar apparatus, the reference timing pulse 11 may occur at a frequency of 5000 cycles per second, or a time spacing of 200 microseconds. The pulse itself may be of a duration of the order of one microsecond and the time interval between the reference timing pulse 11 and the mid-position of the carrier pulse 12 may be of the order of ten microseconds. The method of generating and transmitting the reference and time modulated pulses is not the subject of the present application, and will not be described herein.

The time modulation or "jitter" of the pulse 12 illustrated in Fig. 1A may be employed to transmit various types of intelligence, as for example, an audio frequency or voice modulation. The frequency and wave form of the time modulating signal are substantially unimportant provided that the frequency components of the modulating signal are below the pulse repetition frequency of the transmitter.

Reference is now made to Fig. 2 wherein there is illustrated a demodulating circuit, which for an input signal comprising a time modulated pulse 12 of the character described in connection with Fig. 1A, applied at terminal 21, provides an output signal at terminal 22, which is variable in amplitude in accordance with the time "jitter" of this pulse 12 relative to the pulse 11. The demodulating circuit comprises essentially a pair of coincidence electron tubes 23 and 24 similarly connected as illustrated. Thus the anodes of the coincidence tube 23 and 24 are connected to a positive voltage source 25 through plate load resistors 26 and 27, respectively. Both screen grids are directly connected to the positive source 25 and both cathodes are grounded. The suppressor grids of the coincidence tubes are connected in parallel and to the input terminal 21, and are thereby simultaneously driven positively by each time modulated carrier pulse 12. The received signal, comprising a recurrent wave of the shape illustrated in Fig. 1A, is also applied at terminal 29, which is directly coupled to one grid (not shown) of a coincidence tube circuit 31 and indirectly coupled to another grid thereof, through a delay line 30. The time delay imparted to applied signals by the delay line is substantially equal to the time between a reference pulse 11 and the mid-position 13 of a "jittered" pulse; see Fig. 1A, which in the example described above, is of the order of ten microseconds. Accordingly, the coincidence circuit 31 will not become conductive unless two pulses of time displacement equal to that between reference and "jittered" pulses are applied at terminal 29. The fact that this time is variable at the modulating rate does not preclude coincidence since the maximum time displacement between pulses preferably does not exceed the time duration of the "jittered" pulse 12.

Conduction in coincidence, circuit 31 triggers the double gate generator 32. A double gate generator, as is well understood in the art, generates, when triggered, two electrical impulses delayed in time with respect to each other by a predetermined amount. The use of the delay line 30 and the coincidence circuit 31 prior to the double gate generator 32 ensures that the trailing edge of the first voltage gate and the leading edge of the second voltage gate, preferably coincident, are delayed to coincide in time with the mid-position of the time modulated pulse 12. The use of the coincidence circuit 31 also precludes the triggering of the double gate generator by random pulses, noise or otherwise, which would tend to upset the normal desired performance thereof.

The output of the gate generator 32 is best illustrated in Fig. 1B. The first voltage gate 33 is terminated at a time coincident with the mid-position 13 of the pulse 12. The pulse 34 begins at this time. The gate pulses and the time modulated pulse 12 are substantially of equal time duration. The time position of the voltage gates 33 and 34 relative to the reference timing signal 11 is fixed and is independent of the "jitter" of the time modulated pulse 12.

As illustrated in Fig. 2, the first voltage gate 33 is applied to the control grid of the coincidence tube 23 and the second voltage gate 34 is applied to the control grid of coincidence tube 24. The coincidence tubes 23 and 24 are so adjusted as to be normally non-conductive. Conduction can occur in these tubes only during the period of simultaneous application of the positive pulses illustrated to the control and suppressor grids.

Although the suppressor grids are simultaneously energized, the control grids are energized in succession as determined by the application of the voltage gates 33 and 34. Accordingly, for the condition illustrated, only one of the two coincidence tubes can be conductive at a particular time. The voltage gates 33 and 34 are herein utilized in connection with an integration circuit designed to integrate the difference between the energy output of the coincidence tubes 23 and 24 and comprises essentially rectifier diodes 41 and 42 and their associated circuits.

The cathode of diode 41 is coupled to the plate of coincidence tube 24 through capacitor 43 and is in addition connected to the plate of diode 42 through resistor 44. The cathode of rectifier 42 is coupled to the plate or output circuit of coincidence tube 23 through coupling capacitor 45 and is also returned to ground through resistor 46. The plate of diode 41 is similarly returned to ground through resistor 47, shunted by capacitor 48. The integration is accomplished by a capacitor 51 and the voltage across this capacitor is taken at the output terminal 22 through coupling capacitor 52.

The output signal at terminal 22 is the equivalent of the variable amplitude signals utilized at the transmitter to time modulate the pulse 12 relative to the pulse 11. For an understanding of the operation of the integrating circuit in connection with the coincidence circuit, consider the application at terminal 21 of a pulse 12 displaced in time from the mid-position 13 as illustrated in Fig. 1A. The voltage gates 33 and 34 are applied to the control grids of coincidence tubes 23 and 24 in a time relation to the mid-position time 13, as indicated in Fig. 1B. During the period of time indicated by the shaded area 55 in Fig. 1B, the tube 23 is conductive and accordingly, a negative signal is coupled through capacitor 45 to the cathode of rectifier 42. This negative voltage appearing at the cathode will result in conduction through rectifier 42 and the charging of capacitor 51, such that the ungrounded plate thereof is negative with respect to ground. The termination of the voltage gate 33 correspondingly terminates current flow in coincidence tube 23. The initiation of voltage gate 34 permits conduction in coincidence tube 24 for the duration of the time modulated pulse 12, and thus for a time represented by the shaded area 56 in Fig. 1B. Conduction in coincidence tube 24 provides a negative output voltage coupled through capacitor 43 to the cathode of diode 41. Conduction through diode 41 discharges the capacitor 51 and if the conduction period thereof is greater than the corresponding conduction period of diode 42 previously mentioned, the capacitor 51 will charge positively on the ungrounded plate thereof with reference to the previous cycle of operation. Thus, the output signal at terminal 22 will be positive as indicated by the voltage wave 61.

The potential across capacitor 51 will remain substantially unchanged in the period between the application of pulses. If the succeeding time modulating pulse 12 is displaced further in the same direction indicated in Figs. 1A and 1B, the output signal will become further positive as at 62. In other words, the output wave form will be stepped and the instantaneous magnitude thereof will be dependent upon the time displacement between the time modulated or "jittered" pulse 12 and the reference timing pulse 11. The time between steps is equal to the repetition period of the pulse. Filtering, of course, may be used to smooth the output wave form appearing at terminal 22.

The demodulating circuit hereinabove described provides a substantially large output signal and is thus a preferred embodiment. A somewhat simplified circuit, providing lower output energy may be constructed utilizing the basic principles described. Thus, the coincidence tube 31 may be utilized to initiate, when conductive, a single voltage gate, which with the "jittered" pulse are applied to a single demodulating coincidence tube, such as 23. The energy output of this coincidence tube will vary as a function of the overlap time between gate and "jittered" pulse and thus will provide a signal corresponding to the modulating intelligence.

It will be understood that the specific embodiments of circuits for demodulating the time "jittered" pulses hereinabove described are illustrative and that various modifications may be made without departing from the spirit and scope of the present invention.

What is claimed is:

1. An electric circuit for providing an output signal instantaneously proportional to the time displacement of a time modulated pulse relative to a reference timing pulse, said circuit comprising, a coincidence circuit, a time delay device, means applying said reference pulse and said time modulated pulse directly and through said time delay device to said coincidence circuit to produce a trigger pulse having a predetermined time displacement relative to the unmodulated time displacement of said time modulated pulse upon time coincidence of direct and delayed pulses, a voltage gate generator responsive to said trigger pulse to produce a voltage gate having a predetermined time duration substantially equal to the time duration of said reference pulse, a second coincidence circuit responsive to said time modulated pulse and said voltage gate to produce an output pulse having a width related to the time duration of coincidence of said time modulated pulse and said voltage gate and a detector responsive to said width modulated output pulse to produce an output signal varying in amplitude with the time duration of said width modulated pulse.

2. An electric circuit for providing an output signal instantaneously proportional to the time displacement of the time modulated pulse relative to a reference timing pulse, said circuit comprising a first coincidence circuit, a time delay device, means applying said time modulated pulse and said reference timing pulse directly and through said time delay device to said first coincidence circuit to produce a trigger pulse having a predetermined time displacement relative to the unmodulated time displacement of said time modulated pulse, a voltage gate generator responsive to said trigger pulse to produce first and second adjacent voltage gates having predetermined time durations substantially equal to the time duration of said time modulated pulse, and means responsive to said time modulated pulse and to said first and second voltage gates to produce first and second output pulses having widths related to time duration of coincidence of said time modulated pulse with said first and second voltage gates respectively.

3. In a communication system in which a periodic reference pulse is followed by a carrier pulse having a time displacement relative to the reference pulse in accordance with the instantaneous amplitude of a modulating signal, a demodulator comprising, a coincidence circuit, a time delay device, means applying said reference pulse and said carrier pulse directly and through said time delay device to said coincidence circuit to produce a trigger pulse having a predetermined time displacement relative to said reference pulse upon coincidence of direct and delayed pulses, a voltage gate generator responsive to said trigger pulse to produce first and second adjacent voltage gates each having a predetermined time duration substantially equal to said reference pulse, termination of said first voltage pulse and initiation of said second voltage pulse occurring at the center of an unmodulated carrier pulse, a second coincidence circuit responsive to said carrier pulse and said first voltage gate to produce a first output pulse having a width related to the time duration of coincidence of said carrier pulse with said first voltage gate, a third coincidence circuit responsive to said carrier pulse and said second voltage gate to produce a second output pulse having a width related to the time duration of coincidence of said carrier pulse with said second voltage gate, an integrating capacitor, means including a first rectifier for charging said capacitor in accordance with said first output pulse of said second coincidence circuit, and means including a second rectifier for discharging said integrating capacitor in accordance with said second output pulse of said third coincidence circuit, whereby said integrator capacitor provides a stepped output potential having an amplitude representing the instantaneous amplitude of said modulating signal.

4. In a time modulation pulse communication system wherein the modulating signal is represented by the time interval between a pair of signal pulses, a demodulator comprising, a coincidence circuit, a time delay device, means applying said pair of signal pulses directly and through said time delay device to said coincidence circuit to produce a trigger pulse having a predetermined time displacement relative to the first of said pair of signal pulses upon time coincidence of direct and delayed signal pulses, a voltage gate generator responsive to said trigger pulse to produce first and second adjacent voltage gates having predetermined time displacements relative to said first of said pair of signal pulses, means responsive to the second of said pair of signal pulses and to said first and second voltage gates to produce first and second width modulated pulses having a width related to time duration of coincidence of the second of said pair of signal pulses with said first and second voltage gates respectively, unmodulated signal pulses producing first and second width modulated pulses of equal width, and means responsive to said first and second width modulated pulses to produce an output signal varying in amplitude with the difference of time duration of said width modulated pulses.

References Cited in the file of this patent

UNITED STATES PATENTS

| Number | Name | Date |
|---|---|---|
| 2,199,634 | Koch | May 7, 1940 |
| 2,266,401 | Reeves | Dec. 16, 1941 |
| 2,391,776 | Fredendall | Dec. 25, 1945 |
| 2,433,407 | Tahon | Dec. 30, 1947 |
| 2,455,265 | Norgaard | Nov. 30, 1948 |
| 2,462,110 | Levy | Feb. 22, 1949 |
| 2,482,544 | Jacobsen | Sept. 20, 1949 |
| 2,508,620 | Peterson | May 23, 1950 |
| 2,516,356 | Tull et al. | July 25, 1950 |
| 2,532,338 | Schlesinger | Dec. 5, 1950 |